United States Patent
Alfataierge

(10) Patent No.: US 11,946,824 B2
(45) Date of Patent: Apr. 2, 2024

(54) METHODS FOR DETERMINING SENSOR CHANNEL LOCATION IN DISTRIBUTED SENSING OF FIBER-OPTIC CABLES

(71) Applicant: Saudi Arabian Oil Company, Dhahran (SA)

(72) Inventor: Ezzedeen Alfataierge, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 176 days.

(21) Appl. No.: 17/644,003

(22) Filed: Dec. 13, 2021

(65) Prior Publication Data

US 2023/0184622 A1 Jun. 15, 2023

(51) Int. Cl.
| | |
|---|---|
| G01M 11/00 | (2006.01) |
| E21B 47/04 | (2012.01) |
| E21B 47/135 | (2012.01) |
| G01D 5/353 | (2006.01) |
| G01L 1/24 | (2006.01) |

(Continued)

(52) U.S. Cl.
CPC ......... *G01M 11/3109* (2013.01); *E21B 47/04* (2013.01); *E21B 47/135* (2020.05); *G01D 5/353* (2013.01); *G01D 5/35316* (2013.01); *G01L 1/246* (2013.01); *G01L 25/00* (2013.01); *G02B 6/02076* (2013.01); *G01V 1/20* (2013.01)

(58) Field of Classification Search
CPC .. G01M 11/3109; E21B 47/04; E21B 47/135; G01D 5/353; G01D 5/35316; G01L 1/246; G01L 25/00; G02B 6/02076; G01V 1/20
See application file for complete search history.

(56) References Cited

U.S. PATENT DOCUMENTS

| | | |
|---|---|---|
| 7,548,319 B2 | 6/2009 | Hartog |
| 7,946,341 B2 | 5/2011 | Hartog et al. |

(Continued)

OTHER PUBLICATIONS

Zaidi, Farhan, Tiziano Nannipieri, and Fabrizio Di Pasquale. "High performance fiber optic sensor based on self referenced FBGs and high-speed dual-wavelength pulse coding." Fifth Asia-Pacific Optical Sensors Conference. vol. 9655. SPIE, 2015. (Year: 2015).*

(Continued)

*Primary Examiner* — Dominic J Bologna
(74) *Attorney, Agent, or Firm* — Fish & Richardson P.C.

(57) ABSTRACT

Methods for determining sensor channel location in distributed sensing of fiber-optic cables are disclosed. In one method, three or more Fiber Bragg-Gratings (FBGs) connected in series by a standard telecommunication fiber and interrogated using an input distributed fiber-optic sensing (DFOS) laser, where the input DFOS laser has a single wavelength. The input DFOS laser operates on a single wavelength that is different than the respective wavelengths of each of the three or more FBGs. The three or more FBGs are interrogated using an input broadband FBG laser. Each FBG reflects a wavelength of laser light that is proportional to the grating size, using an optical time domain reflectometer (OTDR) at the FBG wavelength, the distance to the particular FBG in the optical domain is computed and compared to the physical measurement of the FBG location. The sensor channel locations of the DFOS system are calibrated and constrained using this method.

17 Claims, 8 Drawing Sheets

(51) Int. Cl.
    *G01L 25/00*     (2006.01)
    *G01V 1/20*     (2006.01)
    *G02B 6/02*     (2006.01)

(56) References Cited

U.S. PATENT DOCUMENTS

| | | | |
|---|---|---|---|
| 9,784,862 B2 | 10/2017 | Childers et al. | |
| 2003/0234921 A1 | 12/2003 | Yamate et al. | |
| 2009/0202192 A1* | 8/2009 | Taverner | E21B 47/07 385/12 |
| 2011/0110621 A1* | 5/2011 | Duncan | G01D 5/35316 385/13 |
| 2012/0143522 A1* | 6/2012 | Chen | E21B 47/002 702/42 |
| 2012/0176597 A1* | 7/2012 | Asokan | G01K 11/3206 385/12 |

OTHER PUBLICATIONS

Zaidi et al., "High performance fiber optic sensor based on self referenced FBGs and high-speed dual-wavelength pulse coding," Proceedings of SPIE, IEEE, US, 9655:96553R-96553R, Jul. 2015, 4 pages.

PCT International Search report and Written Opinion in International Appln. No. PCT/US2022/052552, dated Apr. 18, 2023, 16 pages.

* cited by examiner

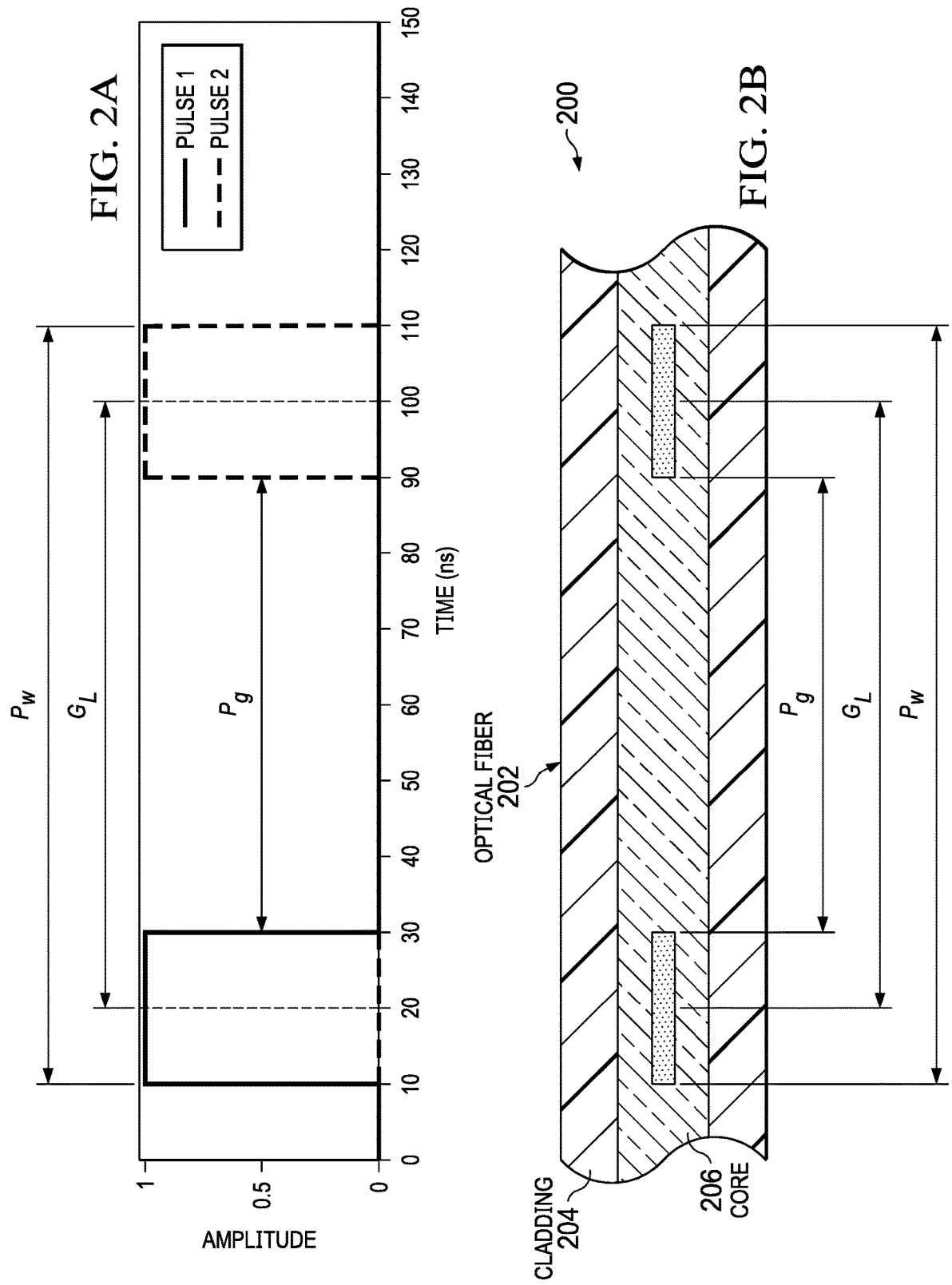

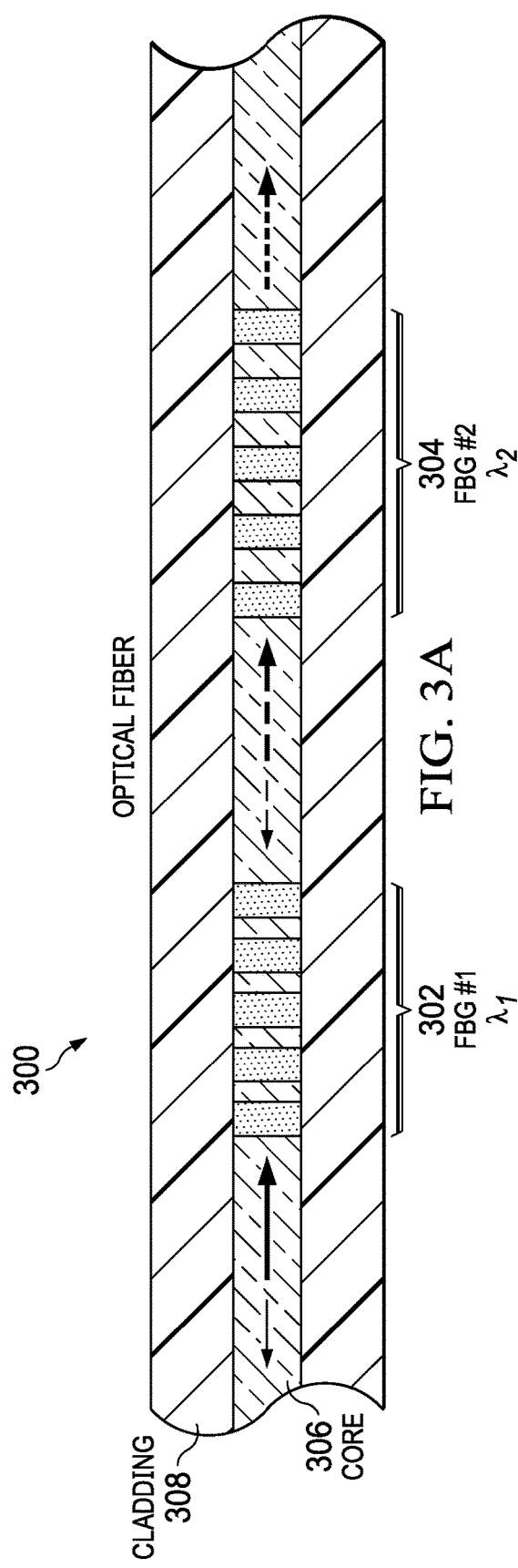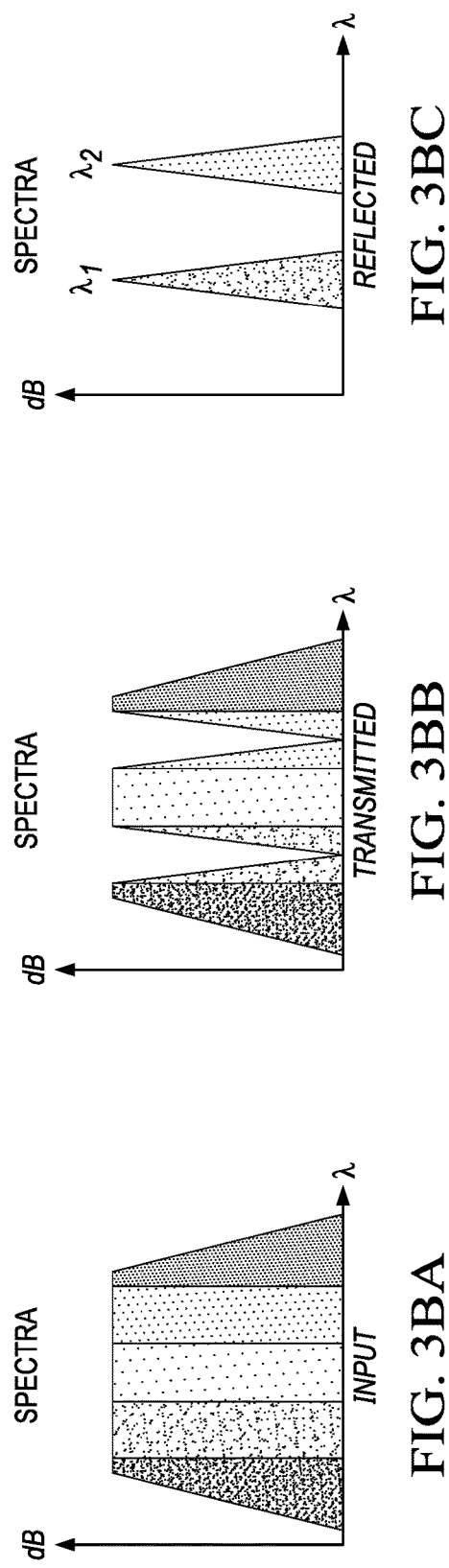
FIG. 3A
FIG. 3BA
FIG. 3BB
FIG. 3BC

METHODS FOR DETERMINING SENSOR CHANNEL LOCATION IN DISTRIBUTED SENSING OF FIBER-OPTIC CABLES

TECHNICAL FIELD

The present disclosure relates to determination of sensing locations (or channel location) with respect to methods of distributed fiber-optic sensing of fiber-optic cables. The methods described present applications to fiber-optic cables installed in a wellbore, on/near a pipeline, and on the ground surface.

BACKGROUND

Determining locations inside a wellbore or a pipeline is very important in many applications related to operations in energy industry. For example, local environmental properties inside a wellbore, such as temperature, strain, and acoustic response, are measured for various applications, and location information associated with these measurements is inferred (interpolated or estimated). Given the constraints in accessing the interior of the wellbore, the location information associated with the measurements of the local environmental properties is often estimated through interpolation between two known locations, one at the wellhead, and the other one at the bottom of the wellbore. The lack of accurate knowledge of multiple locations inside the wellbore affects the accuracy of the estimated locations of the local environmental properties measured inside the wellbore.

SUMMARY

The present disclosure involves methods for determining sensor channel location in distributed sensing of fiber-optic cables. One example method includes interrogating a fiber-optic cable equipped with three or more Fiber Bragg-Gratings (FBGs) connected in series by standard telecommunication grade fiber, using an input distributed fiber-optic sensing (DFOS) laser, where the input DFOS laser operates on a single wavelength that is different than the respective wavelengths of each of the three or more FBGs. The three or more FBGs are interrogated using an input broadband FBG laser. Each FBG reflects a wavelength of laser light that is proportional to the grating size. Using an optical time domain reflectometer (OTDR) at the FBG wavelength, the distance to the particular FBG is computed in the optical domain and compared to the physical measurement of the FBG location. The sensor channel locations of the DFOS system are calibrated and constrained using this example method.

Another example method includes interrogating three or more FBGs connected in series by a standard fiber and placed along a fiber-optic cable using an input DFOS laser, where the input DFOS laser has a first wavelength, the standard fiber is inside the fiber-optic cable, and the first wavelength is different than the respective wavelength of each of the three or more FBGs. The three or more FBGs are interrogated using an input FBG laser. Laser reflected from the three or more FBGs are received at an FBG interrogator after the three or more FBGs are interrogated by the input DFOS laser and the input FBG laser. Locations of the three or more FBGs are determined based on the reflected laser received at the FBG interrogator.

Some or all of the aspects of the present disclosure may be further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 2A and FIG. 2B are each an example illustration of a gauge-length (GL) used in distributed fiber-optic sensing (DFOS) measurements, in accordance with example implementations of this disclosure.

FIG. 3A, FIG. 3BA, FIG. 3BB, and FIG. 3BC illustrate an example system of an optical fiber with multiple Fiber Bragg-Gratings (FBGs) and the corresponding spectral system response of the FBGs, in accordance with example implementations of this disclosure.

DETAILED DESCRIPTION

Fiber-optic sensing enables non-intrusive passive measurements to be recorded remotely without the need for electrical or mechanical sensors. Distributed fiber-optic sensing (DFOS) is a method that has achieved many applications. For example, in the case of collecting measurements inside a wellbore, fiber-optic cables are vertically inserted into the wellbore or installed to the inside of the wellbore. Laser pulses are generated by an interrogator and used to interrogate the optical fiber. The laser light backscattered along the optical fiber can then be collected at the interrogator and used to measure the local environmental properties that are depth-dependent. In DFOS measurements are made along the length of fiber as a function of the so-called gauge-length (GL). The calculation of GL depends on an approximation of the fiber index of refraction.

One source of error in DFOS measurements comes from the approximation of the fiber's index of refraction, which is provided by the fiber manufacturer. In most cases, the fiber index of refraction is approximated at 1.5. This approximation results in inaccuracy in gauge-length computation and consequently inaccuracy in fiber sensor channel location determination.

Another source of error in spatial sampling computation in DFOS is the practice for calibration. The current practice is that two points with known locations are required along the fiber path in order to interpolate in between these two points. For example, DFOS applied to borehole measurements is constrained by the fiber at the wellhead and the fiber at the bottom of the well. The fiber location at the wellhead is determined by pinching the fiber, if possible, or by a wellhead tap test, while the fiber at the bottom of the well is assumed based on the known well measured depth. The accuracy of locating the fiber with the wellhead tap test is limited by the GL as the energy from the tap is smeared across the gauge length. The more accurate method of pin-pointing a location along the fiber is a pinch test. The pinch test consists of bending or pinching the fiber beyond its bend radius leading to a reflection of light in the fiber at the point. The limitation of current practice is that it relies on two points for calibration of the fiber channel locations, which is due to inaccessibility to the fiber in borehole.

This disclosure describes technologies for determining sensor channel location in distributed sensing of fiber-optic cables. In some implementations, the disclosed technologies allow for additional points for calibration to be introduced for various applications of fiber. These additional points may improve the accuracy in fiber sensor channel location determination.

Figure 1:
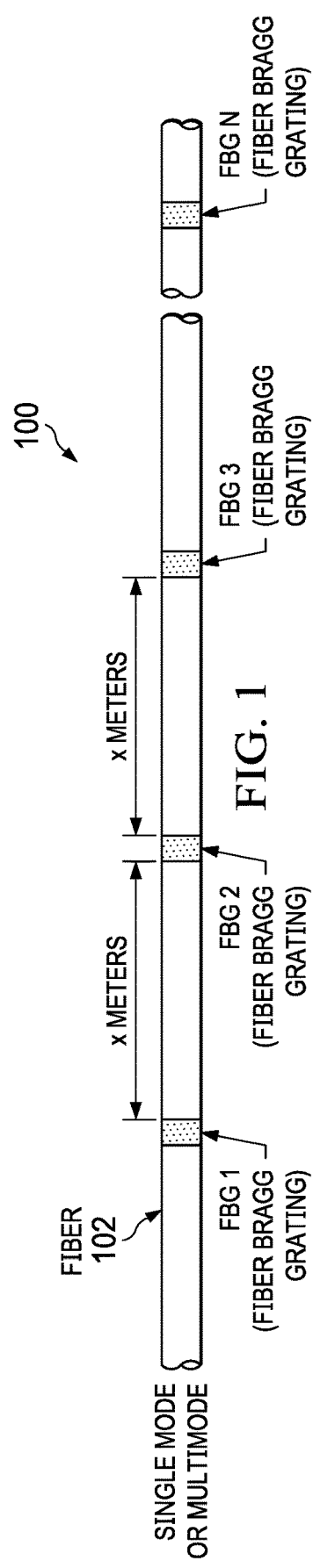
FIG. 1 depicts an example system for determining sensor channel location in distributed sensing of fiber-optic cables, in accordance with example implementations of this disclosure.

FIG. 1 illustrates an example system for determining sensor channel location in distributed sensing of fiber-optic cables, in accordance with example implementations of this disclosure. In some embodiments, an engineered single mode or multi-mode telecommunication grade fiber 102 is combined with Fiber Bragg-Gratings (FBGs) uniformly spaced at known locations along fiber 102, where every two consecutively FBGs along fiber 102 are separated by a fixed interval of x meters, as shown in FIG. 1. The FBGs can reside in fiber 102 or reside in another fiber that is part of the fiber-optic cable that houses fiber 102. The locations of the uniformly spaced FBGs can be determined by interrogating fiber 102 with laser and measuring the reflected laser. For example, when the wavelength of an input DFOS laser used to interrogate fiber 102 is equal to the wavelength of one of the FBGs uniformly spaced along fiber 102, the output from an OTDR at the interrogation end of fiber 102 can show a peak in amplitude at a location that corresponds to the location of that particular FBG.

FIG. 2A and FIG. 2B illustrate an example gauge-length used in DFOS measurements, in accordance with example implementations of this disclosure. In some embodiments, DFOS measurements are made along the length of optical fiber 202 as a function of gauge-length. The gauge-length is illustrated with respect to a dual-pulse distributed sensing system, and can be computed as $G_L$ using the equation below, where Pw is the pulse width, Pg is the pulse gap, V is the speed of light in the fiber, which is a ratio of the speed of light in a vacuum (C) over the fiber's index of refraction n.

$$G_L = V\left(\frac{P_w + P_g}{4}\right), \text{ where } V = \frac{C}{n}.$$

In some embodiments, the parameters of pulse width (Pw) and pulse gap (Pg) are input parameters that corresponds to the amount of light (duration of light) pulsed into the optical fiber 202 via a laser, the speed of light in a vacuum (V) is a known physical parameter, and the fiber's index of refraction (n) is provided by the fiber manufacturer.

FIG. 3A, FIG. 3BA, FIG. 3BB, and FIG. 3BC illustrate an example system of an optical fiber with multiple Fiber Bragg-Gratings (FBGs) and the corresponding spectral system response of the FBGs, in accordance with example implementations of this disclosure. The spectral response of the laser as it passes through the FBGs, as illustrated in FIG. 4, includes the response for the input FBG laser 404, as shown in FIG. 3BA, the response for the transmitted laser pulse after part of the input FBG laser 404 passes through FBG #2 304, as shown in FIG. 3BB, and the response for the reflected laser pulse after part of the input laser reflects back from FBG #1 302 and FBG #2 304, as shown in FIG. 3BC.

Figure 4:
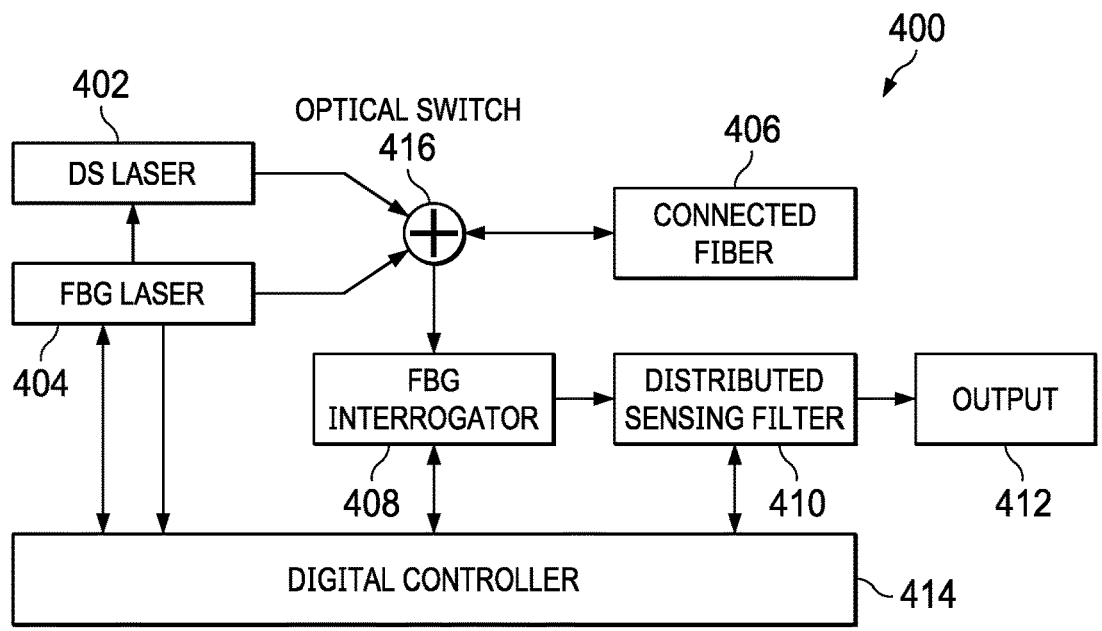
FIG. 4 illustrates an example FGB based system for determining sensor channel location in distributed sensing of fiber-optic cables, in accordance with example implementations of this disclosure.

FIG. 4 illustrates an example FGB based system 400 for determining sensor channel location in distributed sensing of fiber-optic cables, in accordance with example implementations of this disclosure.

In some embodiments, dual interrogation of fiber 406 using DFOS laser 402 and broadband FBG laser 404 is used to simultaneously interrogate fiber 406. DFOS laser 402 and broadband FBG laser 404 are connected to optical switch 416 which fiber 406 is connected to. The wavelength of the DFOS laser 402 does not coincide with the wavelength of any of the FBGs. An iterative process can be performed to investigate the wavelength of each of the FBGs in fiber 406 via OTDR type measurements to infer a measurement of the locations of the FBGs and compare them to the known locations of the FBGs.

In some embodiments, Optical switch 416 redirects reflected laser (backscatter) from FBGs into FBG interrogator 408, which takes in the information of the number of FBGs and their physical locations from a user via digital controller 414. These physical locations of FBGs can be predetermined during the manufacturing process and marked on the fiber-optic cable. The reflected laser is sent from FBG interrogator 408 to distributed sensing filter 410, which filters out spectral components associated with broadband FBG laser 404 and leaves the wavelength of light associated with DFOS laser 402. This filtered signal from distributed sensing filter 410 is output 412, which is used determine the distributed channel sensor locations along fiber 402.

In some embodiments, by placing the FBGs at uniformly spaced locations along the fiber 102 in FIG. 2 (e.g. every 100 meters), the "time of flight" can be used to calibrate the distributed sensing channel locations along fiber 402. In one example, DFOS laser 402 can be used to generate measurements of reflected signal at FBG interrogator 408, and these measurements have a wavelength of DFOS laser 402 that doesn't coincide with the wavelength of any of the FBGs along fiber 406. On the other hand, FBG laser 404 has a broadband spectrum with a range of wavelengths that will encompass the wavelengths of the FBGs. FBG interrogator 408 can identify the FBGs, take information from the user via digital controller 414 to calibrate the distributed fiber channel locations using the known location of each FBG and the observed reflected laser signal for each FBG in the OTDR domain, where time of flight is used to calculate the fiber channel location. i.e., a FBG with a specific wavelength can be observed by FBG interrogator 408, the user will input the location of the FBG, simultaneously FBG interrogator 408 can estimate the location of that FBG in the OTDR domain. The difference between the location from user input and the estimated location from FBG interrogator 408 can be formed to make adjustment to the estimated location from FBG interrogator 408 so that the estimated location from FBG interrogator 408 can equal the location from user input. The adjustment is then sent to the distributed sensing filter 410 to remove the FBG spectra from output 412 and interrogate the wavelength of DFOS laser 402. The FBG locations can be used as set tie points to interpolate channel locations in between the FBG locations.

Figure 5B:
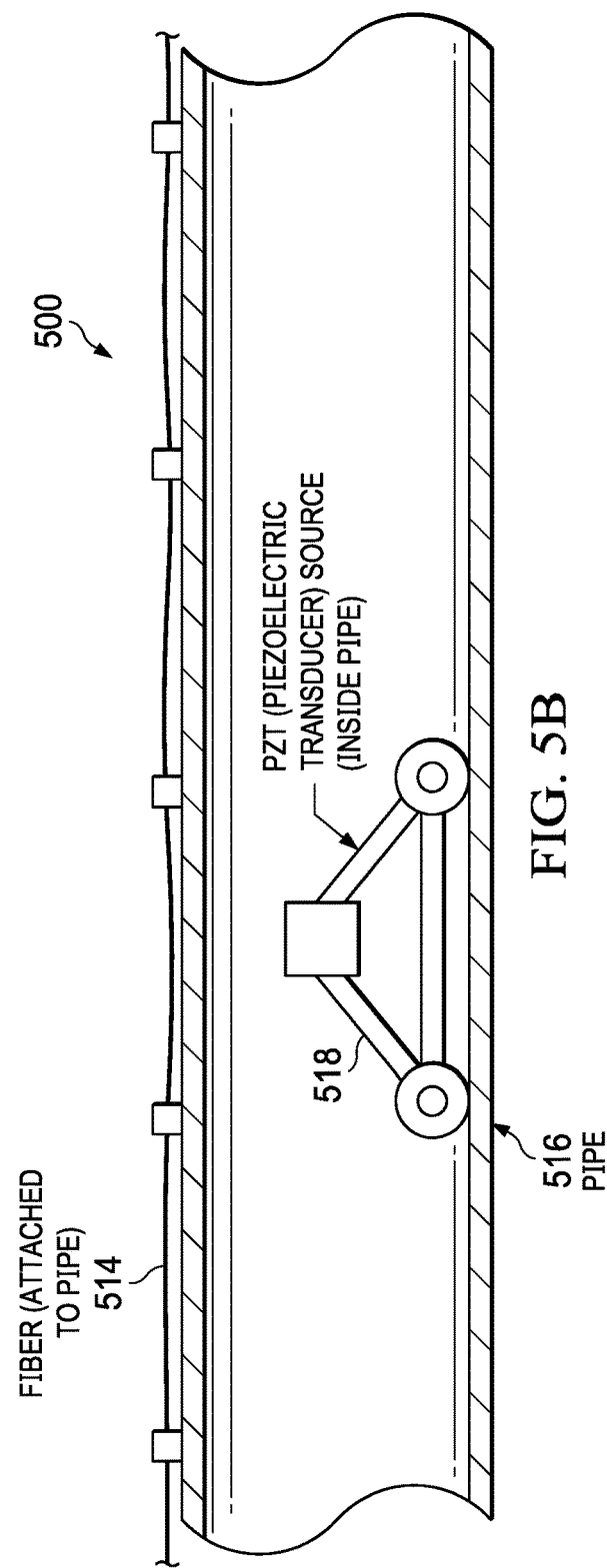
FIG. 5B illustrates an example system that uses a piezo-electric transducer (PZT) source for determining sensor channel location in distributed sensing of fiber-optic cables in a pipeline, in accordance with example implementations of this disclosure.
Figure 5A:
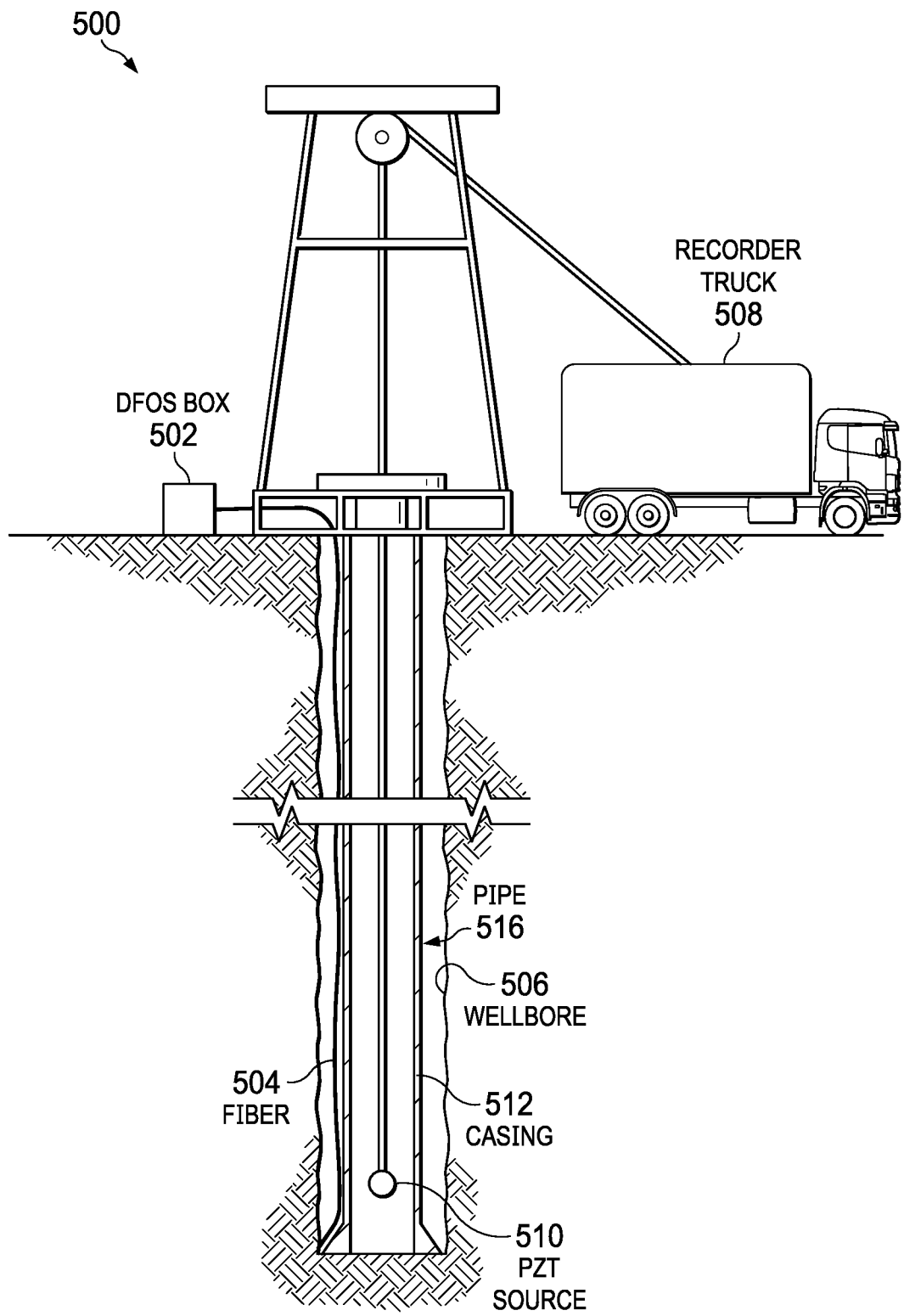
FIG. 5A illustrates an example system that uses a piezo-electric transducer (PZT) source for determining sensor channel location in distributed sensing of fiber-optic cables in a wellbore, in accordance with example implementations of this disclosure.

FIG. 5A and FIG. 5B illustrate two example systems that uses a piezoelectric transducer (PZT) source for determining sensor channel location in distributed sensing of fiber-optic cables in a wellbore and in a pipeline, respectively, in accordance with example implementations of this disclosure. In some embodiments, the first example system with piezoelectric transducer (PZT) source 510 in FIG. 5A is used when PZT source 510 is inside a borehole. In some embodiments, the second example system with PZT source 518 in FIG. 5B is used when PZT source 518 is inside a pipeline. Engineered fiber is not required in either example system in FIG. 5.

In some embodiments, a source energy with known location, for example, PZT source 510 or PZT source 518, is introduced inside a borehole or pipeline to calibrate the measurements as located on the fiber during distributed sensing. The location of the source energy can be obtained using a wireline conveyance system. The use of a smaller GL during this process can limit the smearing of energy across the GL for better location of the source energy. The known source locations are then correlated with the measured sensor channel locations to account for inaccuracy in the DFOS sensor channel locations. In some embodiments, the source energy can be a piezoelectric transducer type, similar to that used in sonic well-logging tools, which can emit high-frequency energy with short wavelengths that would be easy to measure in the distributed sensing system.

Figure 6:
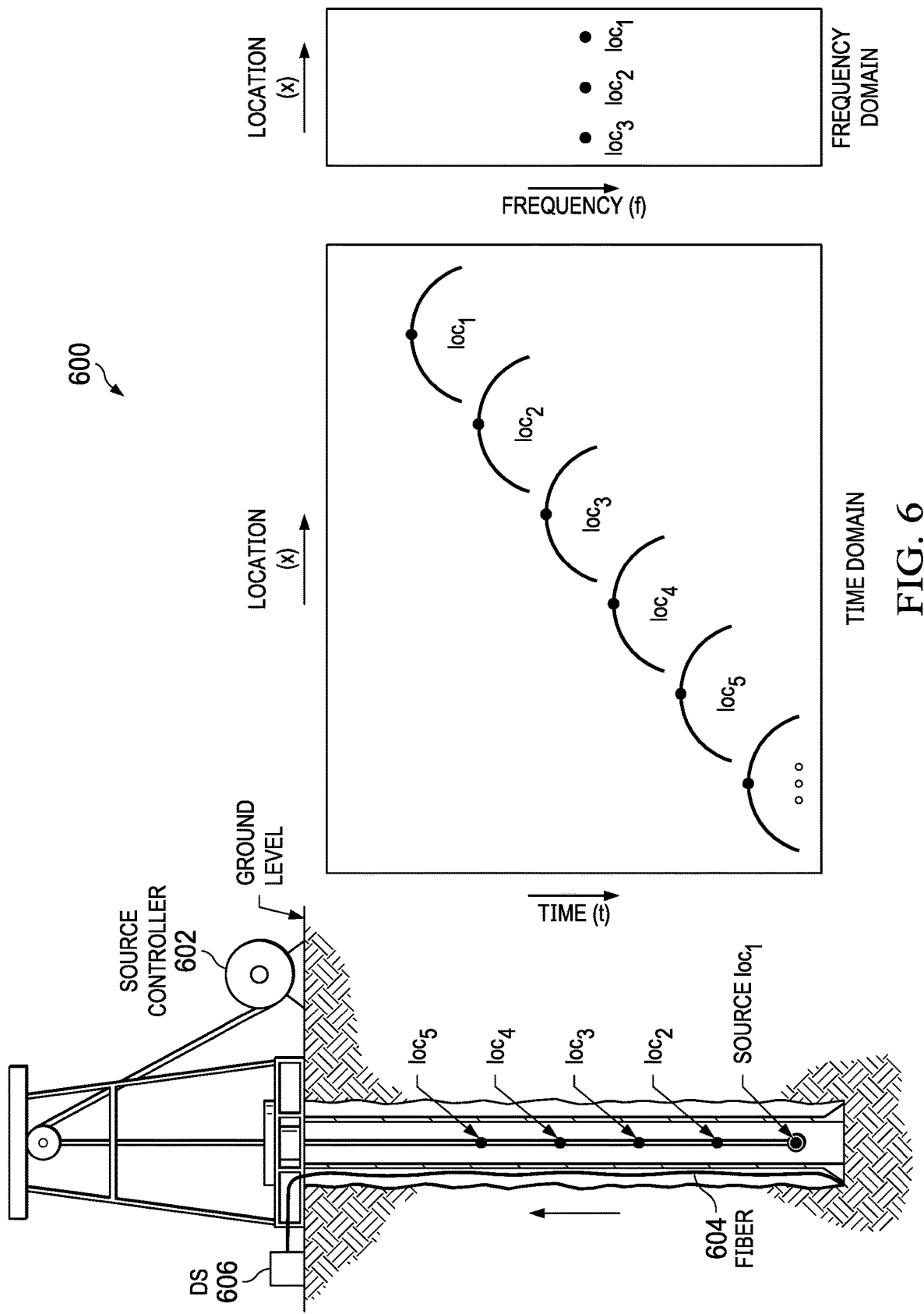
FIG. 6 illustrates an example process for using a source energy to determine sensor channel location in distributed sensing of fiber-optic cables, in accordance with example implementations of this disclosure.

FIG. 6 illustrates an example process for using a source energy in a wellbore to determine sensor channel location in distributed sensing of fiber-optic cables, in accordance with example implementations of this disclosure.

In some embodiments, a distributed sensing (DS) laser 606 interrogates fiber 604. Source controller 602 knows the depth of the source, controls the ignition of the source, and controls the source frequency. A distributed acoustic sensing (DAS) system can be used to visualize the response from the source energy in the time and frequency domain as a function of the length of fiber 604. FIG. 6 illustrates the responses in time domain and frequency domain as the source energy moves up the wellbore at locations $loc_1$ through $loc_5$. The time domain response exhibits move-out of the source energy as a function of dispersion along the fiber path, thus using a mono-frequency DS laser source allows for better precision of estimated locations of the source energy obtained from the frequency domain response.

Figure 7:
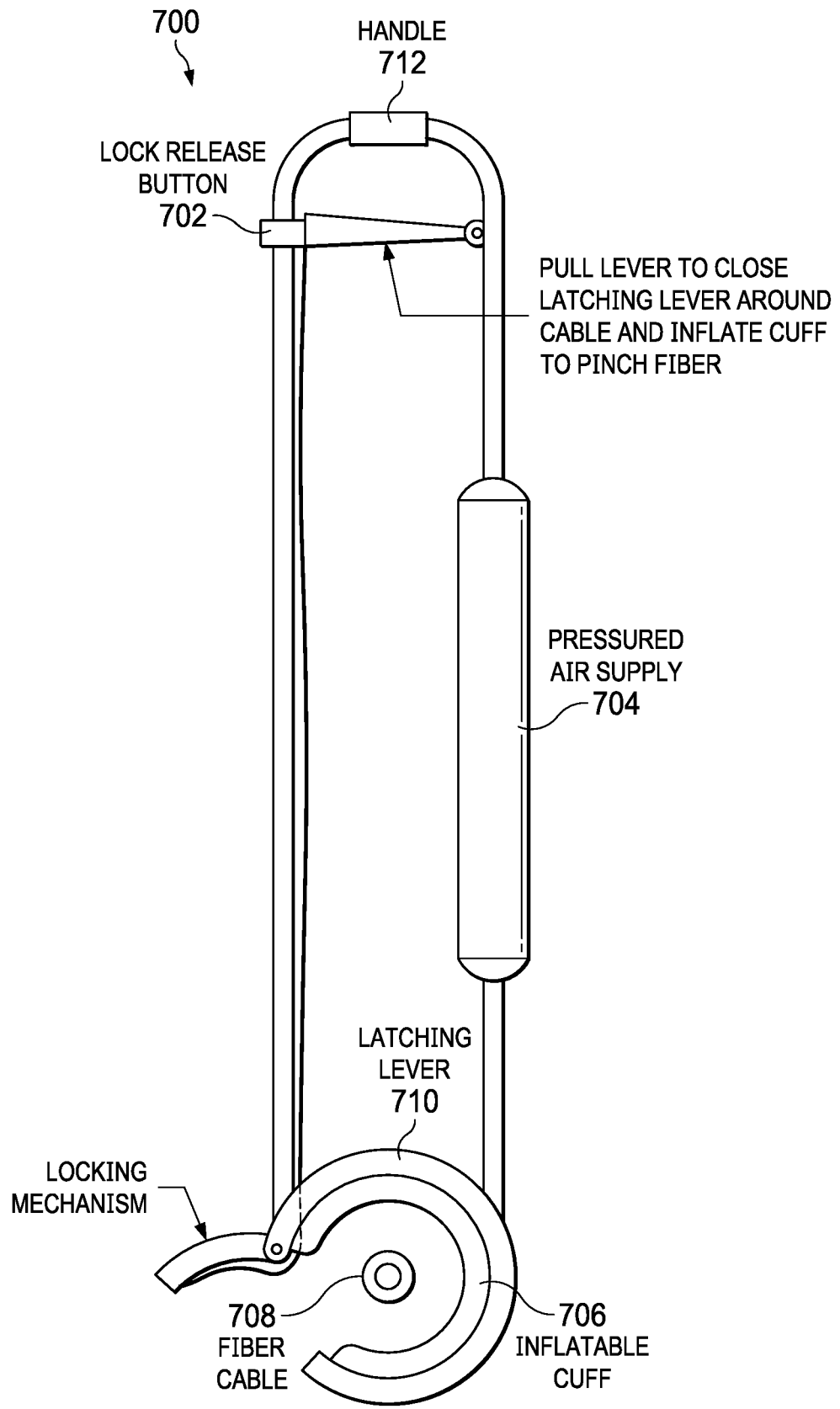
FIG. 7 illustrates an example apparatus for determining sensor channel location in distributed sensing of fiber-optic cables, in accordance with example implementations of this disclosure.

FIG. 7 illustrates an example apparatus 700 for determining sensor channel location in distributed sensing of fiber-optic cables, in accordance with example implementations of this disclosure. In some embodiments, the apparatus 700 is used for pinching fibers deployed at the surface, without breaking the fibers.

The example apparatus 700 consists of several components. In some embodiments, handle 712 with a lever and lock release button 702 are the main control a user has for pinching the fibers inside fiber cable 708. In some embodiments, the pressurized air supply capsule 704 on the frame of the apparatus 700, the latching lever 710, and the inflatable cuff 706 provide the main pinching mechanism. In some embodiments, at a calibration point along the fiber cable 708, a user pulls the lever right below handle 712 to lock the latching lever 700 around the fiber cable 708 and secure the latching level 700, and this triggers the inflatable cuff 706 to inflate and securely pinch the fibers in the fiber cable 708 without breaking the fibers.

In some embodiments, pinching a fiber interrupts the flow of light in the fiber during interrogation, which results in a large reflection of light seen by the OTDR at the interrogation end of the fiber. Once the reflection is observed and the location where the fiber is pinched is noted, the user can press the lock release button 702 that will unlock the latching lever 710 and deflate the inflatable cuff 706 allowing the fiber cable 708 to be set free. The user then proceeds to the next calibration point and repeat the process described above. Therefore a survey can be designed to pinch at multiple uniformly spaced points along the fiber cable to calibrate the fiber-optic channel locations (e.g. every 100 meters).

Figure 8:
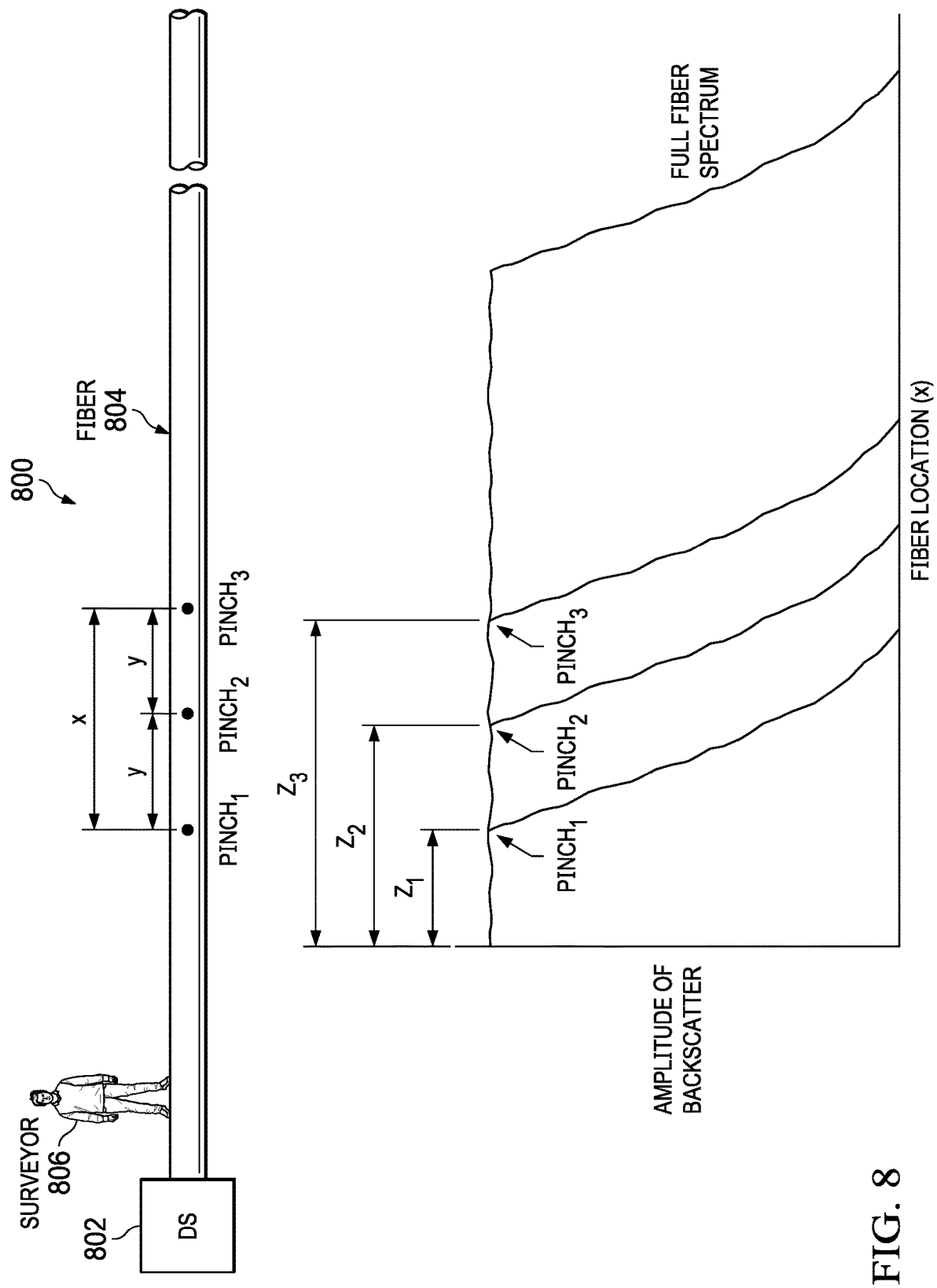
FIG. 8 illustrates an example process for using the example apparatus in FIG. 7 to determine sensor channel location in distributed sensing of fiber-optic cables, in accordance with example implementations of this disclosure.

FIG. 8 illustrates an example process for using apparatus 700 to determine sensor channel location in distributed sensing of fiber-optic cables, in accordance with example implementations of this disclosure.

In some embodiments, a DS laser 802 interrogates fiber 804. A surveyor 806 uses apparatus 700 to pinch fiber 804 at selected locations $pinch_1$, $pinch_2$, $pinch_3$, etc., when fiber 804 is interrogated by DS laser 802. These selected locations are spaced by a distance y. After each pinch performed by surveyor 806, for example, after surveyor 802 performs the pinch at location $pinch_1$, an OTDR at the interrogation end of fiber 804 receives backscatter laser signal due to the pinch and generates an output measurement signal with peak amplitude at $Z_1$ of the location of fiber 804. $Z_1$ is then used as an estimate of the actual location where surveyor 802 pinches fiber 804, i.e., $pinch_1$. Estimated locations $Z_2$ and $Z_3$ for actual locations $pinch_2$ and $pinch_3$ can be obtained in a similar manner.

In some embodiments, to calibrate the fiber-channel locations between pinched locations along fiber 804, locations selected in the measurements, e.g., $Z_1$, $Z_2$ and $Z_3$ can be cross-correlated with the known locations of $pinch_1$, $pinch_2$, and $pinch_3$ from a source conveyance system, for example, a GPS-based source conveyance system.

Figure 9:
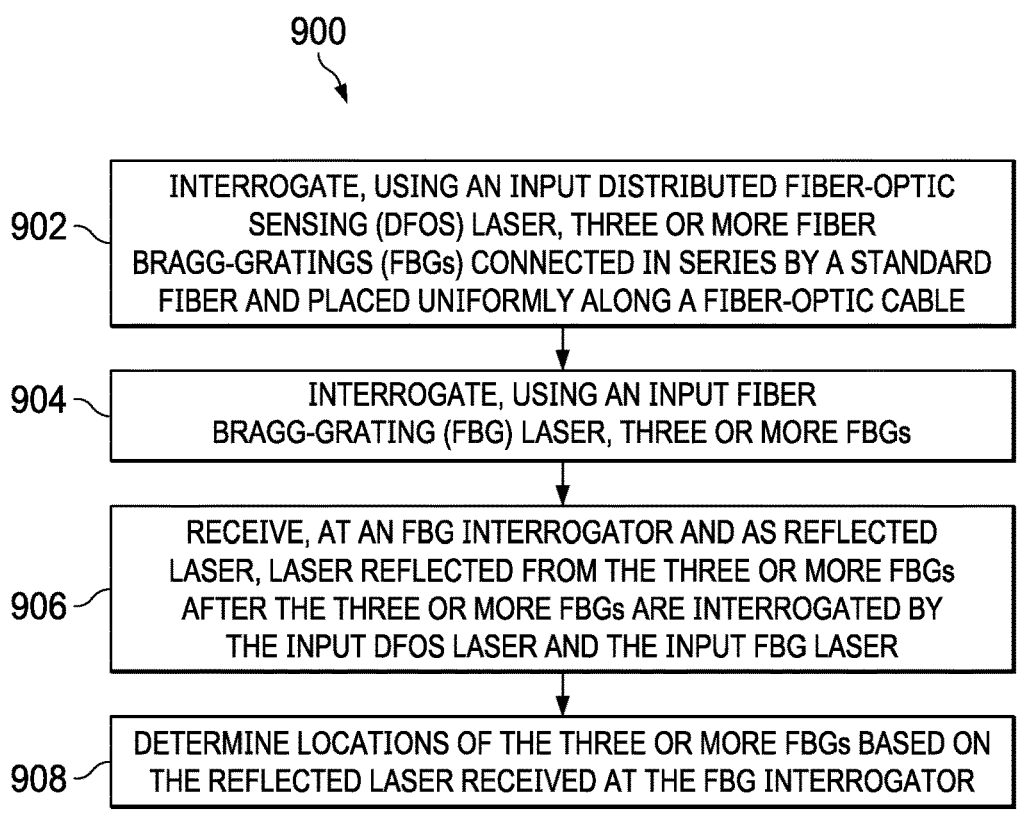
FIG. 9 is a flowchart illustrating an example of a method for determining sensor channel location in distributed sensing of fiber-optic cables, in accordance with example implementations of this disclosure.

FIG. 9 illustrates an example case for determining sensor channel location in distributed sensing of fiber-optic cables, in accordance with example implementations of this disclosure.

At 902, a system interrogates, using an input distributed fiber-optic sensing (DFOS) laser, three or more FBGs connected in series by a standard fiber and placed along a fiber-optic cable.

At 904, the system interrogates, using an input Fiber Bragg-Grating (FBG) laser, the three or more FBGs.

At 906, the system receives, at an FBG interrogator and as reflected laser, laser reflected from the three or more FBGs after the three or more FBGs are interrogated by the input broadband laser and the input FBG laser.

At 908, the system determines locations of the three or more FBGs based on the reflected laser received at the FBG interrogator.

Certain aspects of the subject matter described here can be implemented as a method. Three or more FBGs connected in series by a standard fiber and placed along a fiber-optic cable are interrogated using an input distributed fiber-optic sensing (DFOS) laser. Each of the three or more FBGs has a respective wavelength. The input DFOS laser has a first wavelength. The standard fiber is inside the fiber-optic cable. The first wavelength is different than the respective wavelength of each of the three or more FBGs. The three or more FBGs are interrogated using an input FBG laser. Laser reflected from the three or more FBGs are received at an FBG interrogator after the three or more FBGs are interrogated by the input DFOS laser and the input FBG laser. Locations of the three or more FBGs are determined based on the reflected laser received at the FBG interrogator.

An aspect taken alone or combinable with any other aspect includes the following features. The three or more FBGs are placed at known locations along the fiber-optic cable. Calculation of locations of FBGs placed at unknown locations along the fiber-optic cable is calibrated based on the known locations of the three or more FBGs and the determined locations of the three or more FBGs.

An aspect taken alone or combinable with any other aspect includes the following features. The fiber-optic cable is installed in a casing of a wellbore.

An aspect taken alone or combinable with any other aspect includes the following features. A spectrum of the input FBG laser encompasses the respective wavelength of each of the three or more FBGs.

An aspect taken alone or combinable with any other aspect includes the following features. Locations of points along the fiber-optic cable and between the three or more FBGs are determined by interpolating the determined locations of the three or more FBGs.

An aspect taken alone or combinable with any other aspect includes the following features. The standard fiber comprises a single-mode fiber or a multi-mode fiber.

The preceding figures and accompanying description illustrate example processes and techniques. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, processes with additional operations, fewer operations, and/or different operations may be used so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method, comprising:
    interrogating, using an input distributed fiber-optic sensing (DFOS) laser, three or more Fiber Bragg-Gratings (FBGs) connected in series by a standard fiber and placed along a fiber-optic cable, wherein each of the three or more FBGs has a respective wavelength, wherein the input DFOS laser has a first wavelength, wherein the standard fiber is inside the fiber-optic cable, wherein the three or more FBGs are placed at known locations along the fiber-optic cable, and wherein the first wavelength is different than the respective wavelength of each of the three or more FBGs;
    interrogating, using an input Fiber Bragg-Grating (FBG) laser, the three or more FBGs;
    receiving, at an FBG interrogator and as reflected laser, laser reflected from the three or more FBGs after the three or more FBGs are interrogated by the input DFOS laser and the input FBG laser;
    determining locations of the three or more FBGs based on the reflected laser received at the FBG interrogator; and
    filtering, based on (1) the known locations of the three or more FBGs and (2) the determined locations of the three or more FBGs, the reflected laser using a distributed sensing filter.

2. The method according to claim 1, wherein the distributed sensing filter removes spectral components associated with the input FBG laser from the reflected laser.

3. The method according to claim 1, wherein the method further comprises:
    after determining the locations of the three or more FBGs, calibrating calculation of distributed sensor channel locations along the fiber-optic cable based on the known locations of the three or more FBGs and the determined locations of the three or more FBGs.

4. The method according to claim 3, further comprising:
    before calibrating the calculation of distributed sensor channel locations along the fiber-optic cable, receiving the known locations of the three or more FBGs from a user via a digital controller.

5. The method according to claim 4, wherein the known locations of the three or more FBGs received from the user are predetermined during manufacturing of the three or more Fiber Bragg-Gratings (FBGs) connected in series by the standard fiber.

6. The method according to claim 1, wherein the fiber-optic cable is installed in a casing of a wellbore.

7. The method according to claim 1, wherein a spectrum of the input FBG laser encompasses the respective wavelength of each of the three or more FBGs.

8. The method according to claim 1, further comprising:
    after determining the locations of the three or more FBGs, determining locations of points along the fiber-optic cable and between the three or more FBGs by interpolating the determined locations of the three or more FBGs.

9. The method according to claim 1, wherein the standard fiber comprises a single-mode fiber or a multi-mode fiber.

10. A method, comprising:
    interrogating, using an input distributed fiber-optic sensing (DFOS) laser, three or more Fiber Bragg-Gratings (FBGs) connected in series by a standard fiber and placed along a fiber-optic cable that is installed in a casing of a wellbore, wherein each of the three or more FBGs has a respective wavelength, wherein the input DFOS laser has a first wavelength, wherein the standard fiber is inside the fiber-optic cable, wherein the three or more FBGs are placed at known locations along the fiber-optic cable, and wherein the first wavelength is different than the respective wavelength of each of the three or more FBGs;
    interrogating, using an input Fiber Bragg-Grating (FBG) laser, the three or more FBGs;
    receiving, at an FBG interrogator and as reflected laser, laser reflected from the three or more FBGs after the three or more FBGs are interrogated by the input DFOS laser and the input FBG laser;

determining locations of the three or more FBGs based on the reflected laser received at the FBG interrogator; and filtering, based on (1) the known locations of the three or more FBGs and (2) the determined locations of the three or more FBGs, the reflected laser using a distributed sensing filter.

11. The method according to claim 10, wherein the distributed sensing filter removes spectral components associated with the input FBG laser from the reflected laser.

12. The method according to claim 10, wherein the method further comprises:

calibrating calculation of distributed sensor channel locations along the fiber-optic cable based on the known locations of the three or more FBGs and the determined locations of the three or more FBGs.

13. The method according to claim 12, further comprising:

before calibrating the calculation of distributed sensor channel locations along the fiber-optic cable, receiving the known locations of the three or more FBGs from a user via a digital controller.

14. The method according to claim 13, wherein the known locations of the three or more FBGs received from the user are predetermined during manufacturing of the three or more Fiber Bragg-Gratings (FBGs) connected in series by the standard fiber.

15. The method according to claim 10, wherein a spectrum of the input FBG laser encompasses the respective wavelength of each of the three or more FBGs.

16. The method according to claim 10, wherein the method further comprises:

determining locations of points along the fiber-optic cable and between the three or more FBGs by interpolating the determined locations of the three or more FBGs.

17. The method according to claim 10, wherein the standard fiber comprises a single-mode fiber or a multi-mode fiber.

* * * * *